United States Patent
Branover et al.

(10) Patent No.: US 9,360,906 B2
(45) Date of Patent: Jun. 7, 2016

(54) POWER MANAGEMENT FOR MULTIPLE COMPUTE UNITS

(71) Applicant: Advanced Micro Devices, Inc., Sunnyvale, CA (US)

(72) Inventors: Alexander Branover, Chestnut Hill, MA (US); Steven Kommrusch, Fort Collins, CO (US); Marvin Denman, Round Rock, TX (US); Maurice Steinman, Marlborough, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 254 days.

(21) Appl. No.: 13/875,199

(22) Filed: May 1, 2013

(65) Prior Publication Data
US 2014/0331069 A1   Nov. 6, 2014

(51) Int. Cl.
*G06F 1/32* (2006.01)
*G06F 1/20* (2006.01)
*G06F 1/26* (2006.01)

(52) U.S. Cl.
CPC ............. *G06F 1/206* (2013.01); *G06F 1/26* (2013.01); *G06F 1/3234* (2013.01); *Y02B 60/1275* (2013.01)

(58) Field of Classification Search
None
See application file for complete search history.

(56) References Cited

U.S. PATENT DOCUMENTS

| | | | |
|---|---|---|---|
| 7,188,261 B1 | 3/2007 | Tobias et al. | |
| 2006/0004538 A1* | 1/2006 | Cancel | G06F 1/206 702/136 |
| 2007/0049133 A1* | 3/2007 | Conroy et al. | 439/894 |
| 2007/0157035 A1* | 7/2007 | Gumma et al. | 713/300 |
| 2011/0213950 A1* | 9/2011 | Mathieson | G06F 1/206 712/30 |
| 2012/0066535 A1 | 3/2012 | Naffziger | |
| 2012/0110352 A1 | 5/2012 | Branover et al. | |
| 2012/0146708 A1 | 6/2012 | Naffziger et al. | |
| 2013/0061064 A1* | 3/2013 | Ananthakrishnan et al. | 713/300 |
| 2013/0086395 A1* | 4/2013 | Liu | 713/300 |

* cited by examiner

*Primary Examiner* — Paul Yanchus, III
(74) *Attorney, Agent, or Firm* — Park, Vaughan, Fleming & Dowler LLP

(57) ABSTRACT

An interface couples a plurality of compute units to a power management controller. The interface conveys a power report for the plurality of compute units to the power management controller. The power management controller receives the power report, determines a power action for the plurality of compute units based at least in part on the power report, and transmits a message specifying the power action through the interface. The power action is performed.

20 Claims, 7 Drawing Sheets

200

In a Core Processing Complex (CPC):

Generate a power report for a plurality of compute units in the CPC. (202)

The power report specifies micro-operation retirement counts for respective compute units of the plurality of compute units for a first interval. (204)

The power report specifies one or more amounts of time during which respective compute units are active during a first interval. (206)

Transmit the power report through an interface to a power management controller. (208)

In a Power Management Controller:

Receive the power report through the interface. (210)

Calculate average dynamic power values for the plurality of compute units, based at least in part on the power report. (212)

Allocate dynamic power to the plurality of compute units for a second interval subsequent to the first interval, based at least in part on the average dynamic power values. (214)

Determine expected temperatures of the plurality of compute units during the second interval, based at least in part on the dynamic power allocated to the respective compute units. (216)

Determine a power action for the CPC (e.g., based at least in part on the expected temperatures). (218)

Provide a message specifying the power action to the CPC through the interface. (220)

FIG. 2A

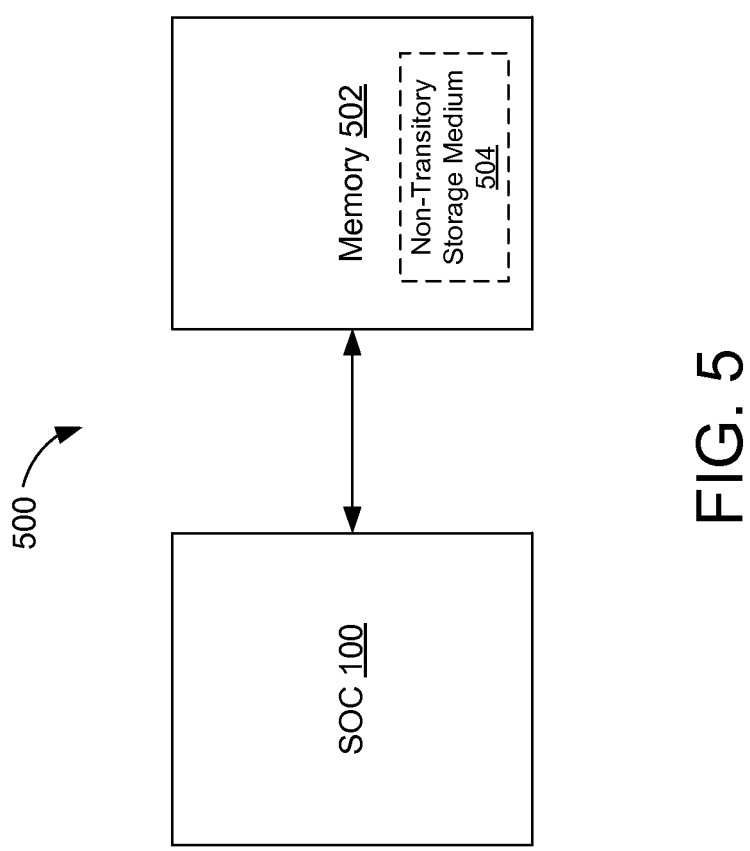

POWER MANAGEMENT FOR MULTIPLE COMPUTE UNITS

TECHNICAL FIELD

The present embodiments relate generally to power management for integrated circuits, and more specifically to power management for multiple compute units (e.g., multiple processor cores).

BACKGROUND

Performing power management in a processor system with multiple compute units (e.g., multiple processor cores) presents significant challenges. For example, the overhead associated with providing power reports from the compute units to a power management controller becomes burdensome as the number of compute units increases. There is also a need for techniques to estimate the power consumed by respective compute units.

SUMMARY

Embodiments are disclosed in which power is allocated for a plurality of compute units based at least in part on a power report providing information regarding activity of the compute units.

In some embodiments, a method of managing processor power is performed in a power management controller. The method includes receiving a power report for a plurality of compute units through an interface, determining a power action for the plurality of compute units based at least in part on the power report, and transmitting a message specifying the power action through the interface.

In some embodiments, a circuit includes an interface and a power management controller coupled to the interface. The interface conveys a power report for a plurality of compute units. The power management controller receives the power report, determines a power action for the plurality of compute units based at least in part on the power report, and transmits a message specifying the power action through the interface.

BRIEF DESCRIPTION OF THE DRAWINGS

The present embodiments are illustrated by way of example and are not intended to be limited by the figures of the accompanying drawings.

FIGS. 2A and 2B are a flowchart showing a method of managing processor power in accordance with some embodiments.

FIG. 5 is a block diagram of a system in which the system-on-a-chip of FIG. 1 is coupled to a memory that includes a non-transitory computer-readable storage medium, in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
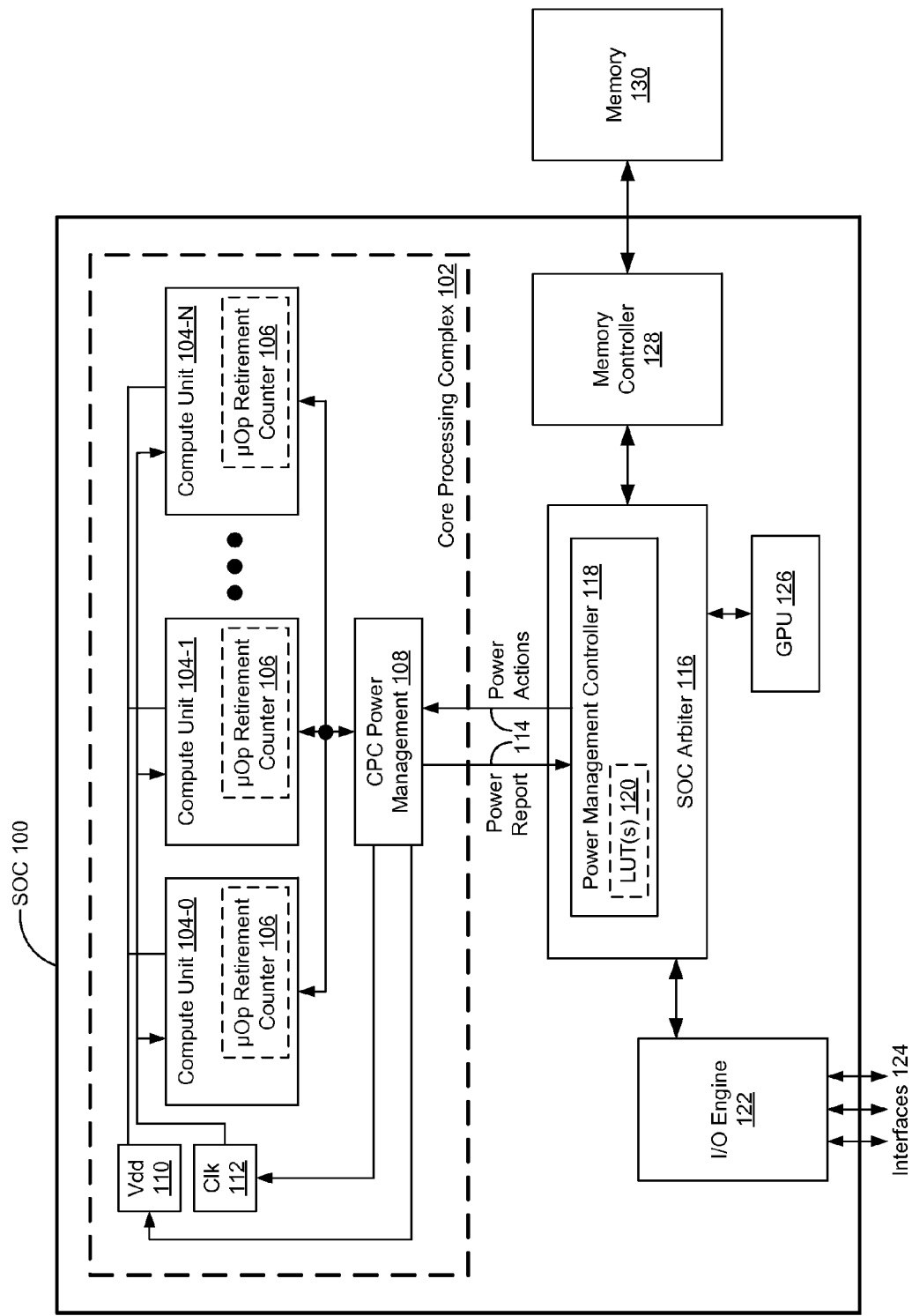
FIG. 1 is a block diagram of a system-on-a-chip in accordance with some embodiments.

FIG. 1 is a block diagram of a system-on-a-chip (SOC) 100 in accordance with some embodiments. The SOC 100 is referred to as a system-on-a-chip because it is implemented in a single integrated circuit and therefore on a single semiconductor die, which is also referred to as a chip. A core processing complex (CPC) 102 in the SOC includes a plurality of compute units 104-0 through 104-N, where N is an integer greater than or equal to one. Each of the compute units 104-0 through 104-N is a discrete processing unit. In some embodiments, all or a portion of the compute units 104-0 through 104-N are processor cores (e.g., central processing unit (CPU) cores). Alternatively, one or more (e.g., all) of the compute units 104-0 through 104-N may be another type of processing unit (e.g., a graphics processing unit (GPU) or discrete portion thereof). The compute units 104-0 through 104-N may be homogeneous (e.g., may all be the same type of processor core) or heterogeneous (e.g., may include different types of processing cores and/or other discrete processing units).

Each of the compute units 104-0 through 104-N (or a portion thereof) includes a micro-operation (pop) retirement counter 106 that counts the number of micro-operations, and thus the number of transactions, retired by the compute unit during a specified time interval. The specified time interval may be configurable. In some embodiments, the specified time interval is in a range between 10 microseconds and 1 millisecond. By recording the number of micro-operations retired during the specified time interval, each micro-operation retirement counter 106 effectively provides a micro-operation retirement rate for its compute unit. This rate is determined, for example, by dividing the micro-operation retirement count at the end of the specified time interval by the duration of the specified time interval. In another example, this rate is a utilization rate determined by dividing the micro-operation retirement count at the end of the specified time interval by a reference retirement count (e.g., a maximum possible retirement count for the specified time interval). The micro-operation retirement counts (and corresponding rates) provide indications of the activity levels and thus power consumption of respective compute units 104-0 through 104-N.

The CPC 102 also includes CPC power management logic 108 coupled to the plurality of compute units 104-0 through 104-N. In some embodiments, the CPC power management logic 108 reads the micro-operation retirement counters 106 (e.g., at the end of each specified time interval) and generates a power report based on the micro-operation retirement counts. For example, the power report includes the micro-operation retirement counts. The power report is transmitted from the CPC power management logic 108 through an interface 114 to a power management controller 118 in an SOC arbiter 116, which in some embodiments is separate from the CPC 102. The CPC power management logic 108 may generate and transmit a separate power report for each specified time interval. In some embodiments, each power report is a single message transmitted across the interface 114. In other embodiments, each power report includes a series of messages transmitted across the interface 114, with each message corresponding to one or more of the compute units 104-0 through 104-N.

In some embodiments, the micro-operation retirement counters 106 are omitted or deactivated. The CPC power management logic 108 may then prepare the power report based on amounts of time in respective specified time intervals during which the compute units 104-0 through 104-N are active (e.g., amounts of time during which respective ones of the compute units 104-0 through 104-N are active).

The CPC power management logic 108 controls a programmable power supply 110 and a clock 112. (While the programmable power supply 110 and clock 112 are shown within the CPC 102, they may be outside of the CPC 102. In some embodiments, the programmable power supply 110 is external to the SOC 100). The CPC power management logic 108 may specify the level of the power supply voltage Vdd provided by the programmable power supply 110 and the frequency of the clock signal provided by the clock 112. A given combination (e.g., predefined combination) of Vdd and clock frequency may be referred to as a performance state or P-state, in accordance for example with the Advanced Configuration and Power Interface (ACPI) specification.

In the example of FIG. 1, each of the compute units 104-0 through 104-N is coupled to the programmable power supply 110 and the clock 112. Changing the level of the power supply voltage Vdd provided by the programmable power supply 110 thus changes Vdd for all of the compute units 104-0 through 104-N. Similarly, changing the frequency of the clock signal provided by the clock 112 changes the clock frequency for all of the compute units 104-0 through 104-N. In other examples, different compute units 104-0 through 104-N may be coupled to different power supplies and/or different clocks.

In some embodiments, each of the compute units 104-0 through 104-N may be selectively coupled to the programmable power supply 110, such that one or more respective compute units 104-0 through 104-N may be decoupled from the programmable power supply 110 (e.g., during a specified time interval or portion thereof), thus placing the one or more respective compute units 104-0 through 104-N in a lower-power state (e.g., the CC6 state). This selective decoupling is referred to as power-gating and may be controlled by the CPC power management logic 108. Power gating may be implemented using header or footer transistors in respective compute units 104-0 through 104-N.

In some embodiments, each of the compute units 104-0 through 104-N may be selectively coupled to the clock 112, such that one or more respective compute units 104-0 through 104-N may be decoupled from the clock 112 (e.g., during a specified time interval or portion thereof), thus placing the one or more respective compute units 104-0 through 104-N in a lower-power state in which they are not clocked. This selective decoupling is referred to as clock-gating and may be controlled by the CPC power management logic 108. For example, the CPC power management logic 108 may provide instructions to respective compute units 104-0 through 104-N to implement power gating and/or clock gating during a specified time interval.

Power gating and/or clock gating may also be performed in embodiments in which different compute units 104-0 through 104-N are coupled to different power supplies and/or different clocks Setting performance states, implementing power gating, and implementing clock gating are examples of power actions that may be performed in the CPC 102. Other examples of power actions include, but are not limited to, powering down a power supply and stopping clocks. In some embodiments, these power actions are performed by the CPC power management logic 108 in response to messages received from the power management controller 118 through the interface 114. For example, the power management controller 118 may transmit a message through the interface 114 to the CPC power management logic 108 specifying one or more power actions for a respective specified time interval. The power management controller 118 may include one or more look-up tables (LUTs) 120 (e.g., LUTs 400, 430, and/or 460, FIGS. 4A-4C) that it uses to determine the power actions (e.g., as described below in the method 200, FIGS. 2A-2B).

In some embodiments, the interface 114 includes one or more signal lines (e.g., unidirectional signal lines) used to transmit power reports from the CPC power management logic 108 to the power management controller 118 and one or more signal lines (e.g., unidirectional signal lines) used to transmit messages specifying power actions from the power management controller 118 to the CPC power management logic 108. Alternatively, the interface 114 includes a bidirectional set of one or more signal lines for conveying both the power reports and the messages specifying power actions.

The SOC arbiter 116 also serves as an interface between the CPC 102 and a memory controller 128, input/output (I/O) engine 122, and GPU 126. The memory controller 128 couples to external memory 130 through one or more interfaces (e.g., double-data rate or DDR interfaces). The memory 130 may include main memory (e.g., implemented in DRAM) and one or more levels of cache memory (e.g., a last-level cache memory, which may be implemented in SRAM). The I/O engine 122 is coupled to and controls interfaces 124. Examples of interfaces 124 include, but are not limited to, Ethernet (e.g., gigabit Ethernet) interfaces, universal serial bus (USB) interfaces, and PCI Express (PCIe) interfaces. As the presence of the GPU 126 shows, the SOC 100 may include compute units outside of the CPC 102 that are not subject to power actions specified by messages transmitted through the interface 114.

In the example of FIG. 1, the power management controller 118 is implemented on the same die as the CPC 102. Alternatively, the power management controller 118 may be implemented on a separate die than the CPC 102 (e.g., in a different package or stacked in the same package). In such embodiments, the interface 114 couples the two die.

Figure 2B:
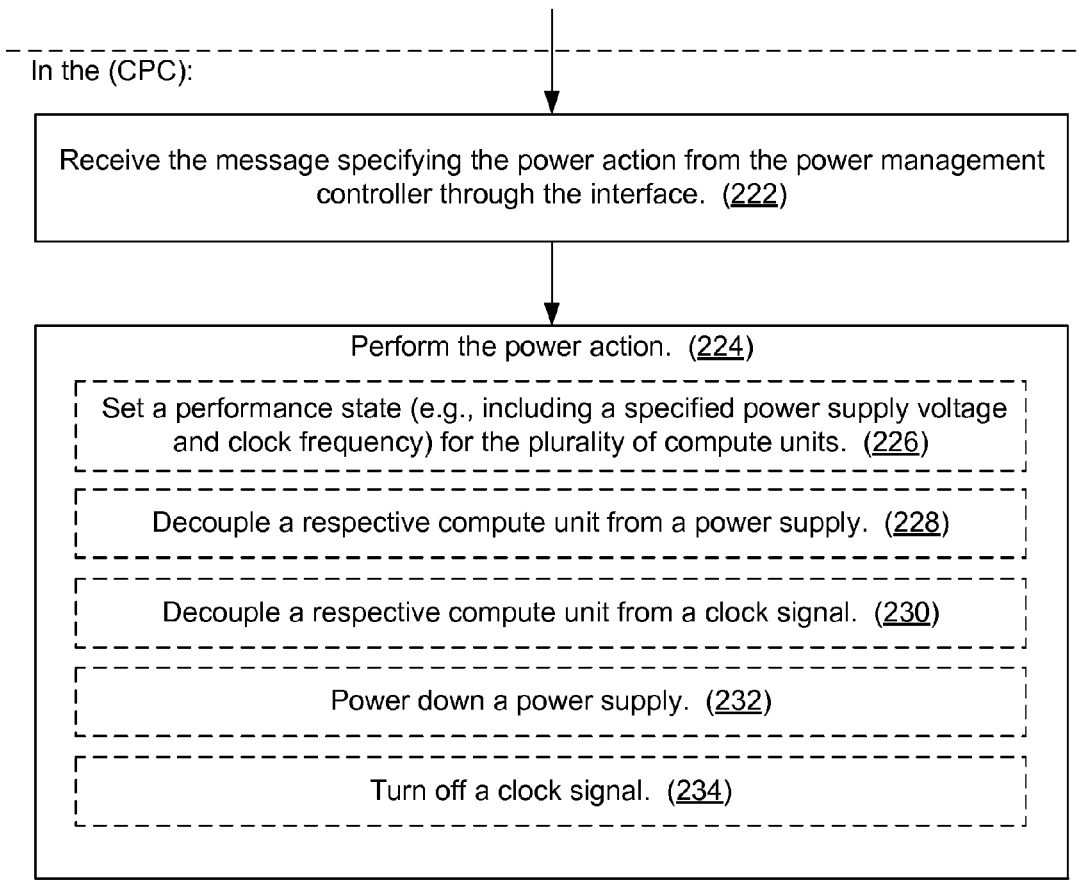

FIGS. 2A and 2B are a flowchart showing a method 200 of managing processor power in accordance with some embodiments. The method 200 may be performed in the SOC 100 or in another system in which a plurality of compute units 104-0 through 104-N are coupled to a power management controller 118.

A first portion of the method 200 is performed in the CPC 102 (FIG. 1) in accordance with some embodiments. A power report is generated (202, FIG. 2A) for the plurality of compute units 104-0 through 104-N. The power report is generated, for example, by the CPC power management logic 108 (FIG. 1).

In some embodiments, the power report specifies (204) micro-operation retirement counts for respective compute units of the plurality of compute units 104-0 through 104-N for a first interval. The first interval may be one of a series of specified time intervals. The micro-operation retirement counts are obtained from the micro-operation retirement counters 106 (FIG. 1).

In some embodiments, the power report specifies (206) one or more amounts of time during which respective compute units of the compute units 104-0 through 104-N are active during a first interval.

The power report is transmitted (208) through the interface 114 (FIG. 1) to the power management controller 118 (FIG. 1).

A second part of the method 200 is performed in the power management controller 118 (FIG. 1) in accordance with some embodiments. The power report is received (210) through the interface 114. Average dynamic power values are calculated (212) for the plurality of compute units 104-0 through 104-N, based at least in part on the power report.

To calculate (212) the average dynamic power values for the plurality of compute units 104-0 through 104-N, average static power for each of the compute units 104-0 through 104-N is first determined. In some embodiments, to determine average static power, the static power for the CPC 102 is measured with every one of the compute units 104-0 through 104-N in an operating state (e.g., the C0 state, as defined by the ACPI specification) and again in a power-gated state (e.g., the CC6 state). A different operating-state (e.g., C0) measurement may be made for each performance state (e.g., each allowed combination of Vdd and clock frequency). Static power is measured by placing the CPC 102 in the appropriate state and then stopping the clock 112 (or clock-gating the compute units 104-0 through 104-N). The measured values are divided by the number of compute units 104-0 through 104-N (i.e., by N+1) to determine the per-compute-unit average static power in the operating state and power-gated state. The average static power for each of the compute units 104-0 through 104-N during a specified time interval is then determined by taking an average of the per-compute-unit average static power in the operating state and in the power-gated state, weighted by the amount of time during the specified time interval that the compute unit spends in each state. For example, if the operating state is C0 and the power-gated state is CC6, the average static power for each compute unit is:

$$\text{Avg\_Stat\_Pwr}(i) = (CC6\_time*CC6\_pwr + C0\_time*C0\_pwr)/\text{interval} \quad (1)$$

where i is a variable used to index the compute units 104-0 through 104-N, Avg_Stat_Pwr(i) is the average static power for a respective compute unit i, interval is the duration of the specified time interval, CC6_time is the amount of time that the compute unit i spends in CC6 during the specified time interval, C0_time is the time that the compute unit i spends in C0 during the specified time interval, CC6_pwr is the per-compute-unit average static power in CC6, and C0_pwr is the per-compute-unit average static power in C0.

Once the average static power has been determined (e.g., using equation 1), average dynamic power may be determined. A total dynamic power for the CPC 102 (CPC_Dyn_Pwr) is determined by measuring the overall power for the CPC 102 and subtracting the sum of the average static powers for the compute units 104-0 through 104-N (e.g., as calculated using equation 1). If the power report provided micro-operation retirement counts, the average dynamic power for each compute unit may then be determined by multiplying the overall power for the CPC 102 by the ratio of the micro-operation retirement count for the compute unit to the sum of the micro-operation retirement counts for all of the compute units 104-0 through 104-N:

$$\text{Avg\_Dyn\_Pwr}(i) = (\mu op\_count(i)/\Sigma(\mu op\_count(i)))*CPC\_Dyn\_Pwr \quad (2)$$

where µop_count(i) is the micro-operation retirement count for a respective compute unit i and the summation is over i.

If the power report does not provide micro-operation retirement counts, but instead provides one or more amounts of time during which respective compute units 104-0 through 104-N are active during the specified time interval, then the average dynamic power for each compute unit may be determined as follows, in accordance with some embodiments. The overall power for the CPC 102 is multiplied by the ratio of the amount of time during which the compute unit is active during the specified time interval to the duration of the specified time interval:

$$\text{Avg\_Dyn\_Pwr}(i) = CU\_Active\_Time(i)*CPC\_Dyn\_Pwr/\text{interval} \quad (3)$$

where CU_Active_Time(i) is the amount of time during which a respective compute unit i is active during the specified time interval. Avg_Dyn_Pwr(i) has the same value for all compute units that spent the same amount of time in an active state during the specified time interval.

Figure 3A:
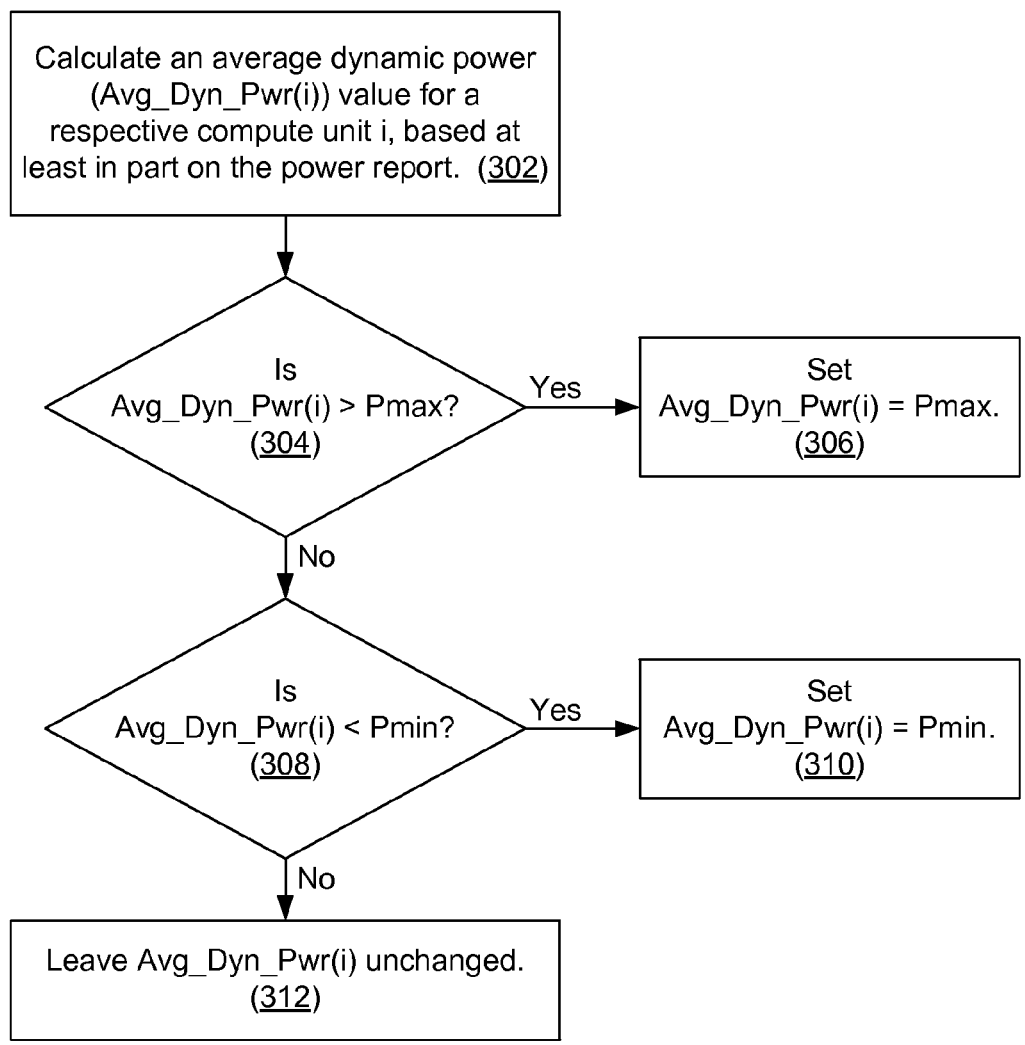
FIG. 3A is a flowchart showing a method of applying limits to an average dynamic power value in accordance with some embodiments.

In some embodiments, limits are applied to the average dynamic power values for the compute units 104-0 through 104-N. FIG. 3A is a flowchart showing a method 300 of applying limits to an average dynamic power value in accordance with some embodiments. The method 300 may be performed for each of the compute units 104-0 through 104-N (e.g., for each value of i). An average dynamic power value is calculated (302) for a respective compute unit i, based at least in part on the power report (e.g., using equation 2 or 3). The average dynamic power value is compared (304) to a predefined maximum power value (Pmax). If the average dynamic power value is greater than Pmax (304—Yes), the average dynamic power value is set (306) equal to Pmax. If not (304—No), the average dynamic power value is compared (308) to a predefined minimum power value (Pmin). If the average dynamic power value is less than Pmin (308—Yes), the average dynamic power value is set (310) equal to Pmin. Otherwise the average dynamic power value is left unchanged (312), since it is greater than or equal to Pmin and less than or equal to Pmax. The order of the operations 304 and 308 in the method 300 may be reversed.

Returning to FIG. 2A, dynamic power is allocated (214) to the plurality of compute units 104-0 through 104-N for a second interval subsequent to the first interval, based at least in part on the average dynamic power values.

Figure 3B:
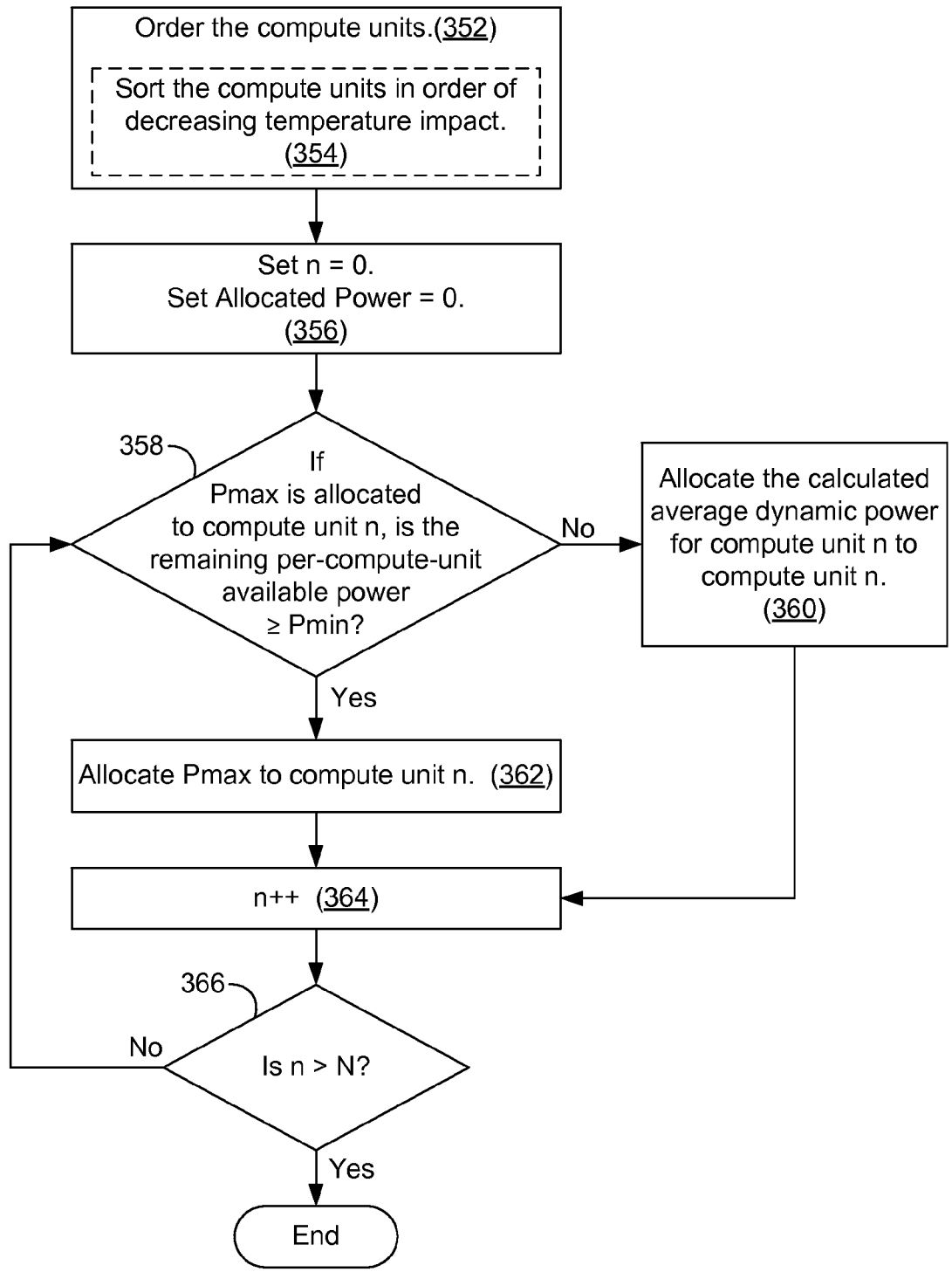
FIG. 3B is a flowchart showing a method of allocating dynamic power to a plurality of compute units in accordance with some embodiments.

FIG. 3B is a flowchart showing a method 350 of allocating dynamic power to the plurality of compute units 104-0 through 104-N in accordance with some embodiments. The method 350 is an example of the dynamic power allocation operation 214 (FIG. 2A). In the method 350, an order of the compute units 104-0 through 104-N is determined (352). For example, an array is created listing the compute units 104-0 through 104-N in the determined order, as indexed by a variable n. In some embodiments, the compute units 104-0 through 104-N are sorted (354) in decreasing order of temperature impact on the SOC 102 (FIG. 1). The temperature impacts of respective compute units 104-0 through 104-N depend on the physical positions of the compute units 104-0 through 104-N on the die, and thus on the floorplan/layout of the die. For example, a compute unit in the middle of the die, bordered by other compute units, has a higher temperature impact than a compute unit near the edge of the die that is not bordered by other compute units along one or more sides, because the former compute unit dissipates heat less easily than the latter compute unit. Alternatively, the compute units 104-0 through 104-N are placed in an arbitrary order.

Power is then allocated to successive compute units in the determined order, as specified by the variable n. First, n is set (356) equal to zero and the allocated power is set (356) equal to zero. It is determined (358) whether allocating Pmax to compute unit n would leave enough remaining power to allocate at least Pmin to all remaining compute units.

If enough power would be left (358—Yes), Pmax is allocated (362) to compute unit n and the allocated power is incremented accordingly. Otherwise (358—No), the average dynamic power for compute unit n (i.e., Avg_Dyn_Pwr(n)), as determined for example in the method 300 (FIG. 3A), is allocated (360) to the compute unit n.

The variable n is incremented (364) by one (n++). It is determined (366) whether n is greater than N, and thus whether power has been allocated to all of the compute units 104-0 through 104-N. If n is not greater than N (366—No), such that power has not been allocated to all of the compute units 104-0 through 104-N, then the method 350 returns to operation 358. If n is greater than N (366—Yes), then the method 350 ends.

Figure 4A:
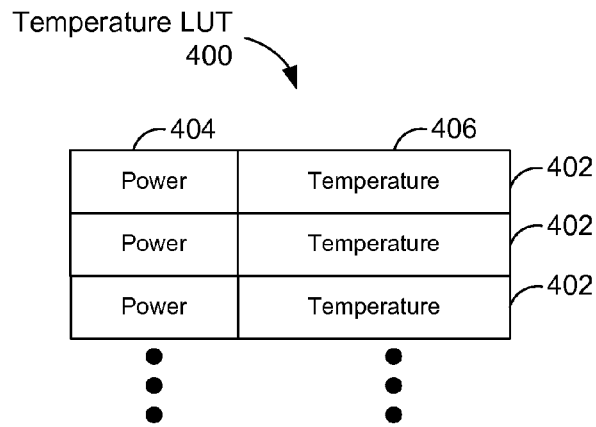
FIGS. 4A-4C show look-up tables to be used by a power management controller in accordance with some embodiments.

Returning to FIG. 2A, expected temperatures of the plurality of compute units 104-0 through 104-N during the second interval are determined (216), based at least in part on the dynamic power allocated (214) to the respective compute units (e.g., in the method 350, FIG. 3B). In some embodiments, a temperature look-up table (LUT) 400 is used to determine the expected temperatures, as shown in FIG. 4A in accordance with some embodiments. The temperature LUT 400 is an example of a LUT 120 in the power management controller 118 (FIG. 1). The temperature LUT 400 includes a plurality of rows 402, each with an entry 404 for a power value (e.g., a value of Avg_Dyn_Pwr) or range of power values and an entry 406 for a temperature. Each row 402 thus maps a power value or range of power values to a temperature. When a value of Avg_Dyn_Pwr is provided to the temperature LUT 400, the temperature in a corresponding entry 406 is returned. In some embodiments, each row 402 includes multiple entries 406, each corresponding to a distinct ambient temperature or range of ambient temperatures. Alternatively, there are multiple LUTs 400, each corresponding to a distinct ambient temperature or range of ambient temperatures.

Figure 4B:
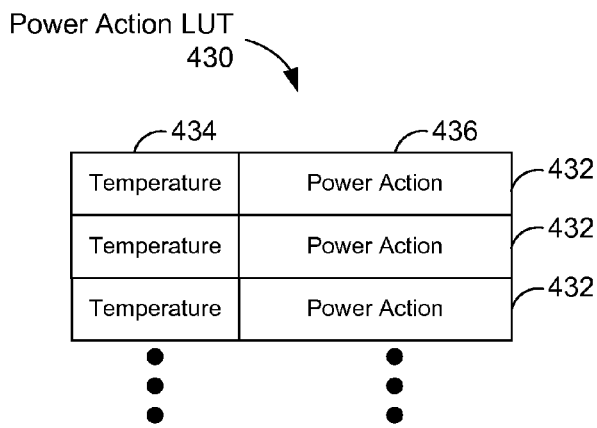

A power action for the CPC 102 (FIG. 1) is determined (218). In some embodiments, the power action is determined based at least in part on the expected temperatures. For example, a power-action LUT 430 is used to determine the power action, as shown in FIG. 4B in accordance with some embodiments. The power-action LUT 430 is an example of a LUT 120 in the power management controller 118 (FIG. 1). The power-action LUT 430 includes a plurality of rows 432, each with an entry 434 for a temperature (e.g., as determined using the temperature LUT 400, FIG. 4A) or range of temperatures and an entry 436 for a power action. Each row 402 thus maps a temperature or range of temperatures to a power action. When a temperature (e.g., an expected temperature as determined in the operation 216) is provided to the power-action LUT 430, the power action in a corresponding entry 436 is returned. In some embodiments, the power management controller 118 identifies the highest expected temperature determined for one of the compute units 104-0 through 104-N and performs a look-up for that temperature in the power-action LUT 430 to determine a power action.

Because the power action is determined (218) based at least in part on the expected temperatures, and the expected temperatures are determined (216) based at least in port on the allocated dynamic power, the power action is thus determined based at least in part on the allocated dynamic power. Furthermore, because the dynamic power is allocated (214) based at least in part on average dynamic power values calculated (212) based at least in part on the power report, the power action is thus determined based at least in part on the power report.

Figure 4C:
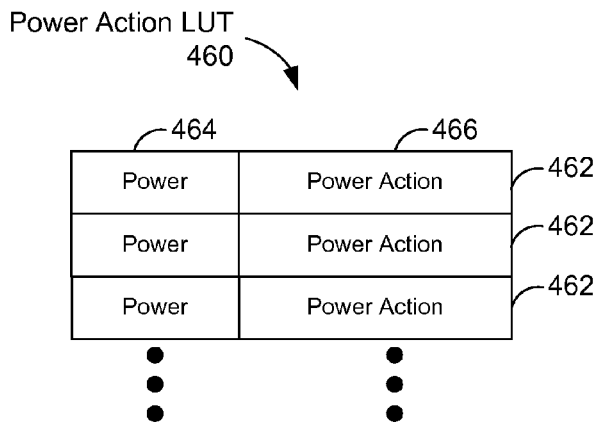

In some embodiments, the expected temperature determination 216 is omitted from the method 200. Instead, a power action for the CPC 102 (FIG. 1) is determined directly based on calculated or allocated average dynamic power. FIG. 4C shows a power-action LUT 460 used to determine power actions based directly on power. The power-action LUT 460 is an example of a LUT 120 in the power management controller 118 (FIG. 1). The power-action LUT 460 includes a plurality of rows 462, each with an entry 464 for a power value (e.g., a value of Avg_Dyn_Pwr) or range of power values and an entry 466 for a power action. Each row 462 thus maps a power value or range of power values to a power action. When a power value (e.g., as allocated in the method 350, FIG. 3B) is provided to the power-action LUT 460, the power action in a corresponding entry 466 is returned.

A message specifying the power action is provided (220) to the CPC 102 through the interface 114 (FIG. 1).

A third part of the method 200 is performed in the CPC 102 in accordance with some embodiments. The message specifying the power action is received (222) from the power management controller 118 through the interface 114 (FIG. 1). The power action is performed (224).

In some embodiments, performing (224) the power action includes setting (226) a performance state for the plurality of compute units 104-0 through 104-N. Setting the performance state may include specifying (e.g., changing) a power supply voltage (e.g., as provided by the programmable power supply 110, FIG. 1) and/or clock frequency (e.g., of a clock signal provided by the clock 112, FIG. 1).

In some embodiments, performing (224) the power action includes decoupling (228) a respective compute unit from a power supply (e.g., the programmable power supply 110, FIG. 1). In some embodiments, performing (224) the power action includes decoupling (230) a respective compute unit from a clock signal (e.g. as provided by the clock 112, FIG. 1). In some embodiments, performing (224) the power action includes powering down (232) (e.g., turning off) a power supply (e.g., the programmable power supply 110, FIG. 1). In some embodiments, performing (224) the power action includes turning off (234) a clock signal (e.g., stopping a clock). The power action thus may include power gating, power-down, clock gating, and/or clock turn-off in accordance with some embodiments.

While the method 200 includes a number of operations that appear to occur in a specific order, it should be apparent that the method 200 can include more or fewer operations. Two or more operations may be combined into a single operation and performance of two or more operations may overlap.

In some embodiments, all or a portion of the method 200 (FIGS. 2A-2B) may be implemented in software (e.g., firmware). A non-transitory computer-readable storage medium may store instructions for performing all or a portion of the method 200. FIG. 5 is a block diagram of a system 500 in which the SOC 100 (FIG. 1) is coupled to a memory 502 that includes a non-transitory computer-readable storage medium 504, in accordance with some embodiments. The SOC 100 may be coupled to the memory 502 through the memory controller 128, I/O engine 122, or another interface. The non-transitory computer-readable storage medium 504 may be implemented as one or more nonvolatile memory devices (e.g., a read-only memory (ROM), Flash memory, hard-disk drive, etc.). The non-transitory computer-readable storage medium 504 stores instructions that, when executed by the SOC 100, cause the SOC 100 to perform all or a portion of the method 200. For example, the CPC power management logic 108 may include a microcontroller that executes instructions stored on the non-transitory computer-readable storage medium 504 to perform operations 202, 208, 222, and/or 224 of the method 200. The power management controller 118 may include a microcontroller that executes instructions stored on the non-transitory computer-readable storage medium 504 to perform operations 210, 212, 214, 216, 218, and/or 220 of the method 200. While FIG. 5 shows the non-transitory computer-readable storage medium 504 as being external to the SOC 100, the non-transitory computer-readable storage medium 504 may alternatively be included within the SOC 100.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing processor power, comprising:
in a power management controller:
receiving a power report for a plurality of compute units through an interface;
determining a power action for the plurality of compute units based at least in part on the power report and a temperature impact for at least one compute unit of the plurality of compute units, the temperature impact for the at least one compute unit determined based at least in part on a physical position of the at least one compute unit with respect to at least one other compute unit and one or more edges of a die on which the compute unit and the at least one other compute unit are located; and
transmitting a message specifying the power action through the interface.

2. The method of claim 1, wherein the power report specifies micro-operation retirement counts for respective compute units of the plurality of compute units.

3. The method of claim 2, wherein the micro-operation retirement counts are for a first interval, the method further comprising:
calculating average dynamic power values for the respective compute units during the first interval, based at least in part on the micro-operation retirement counts; and
allocating dynamic power to the respective compute units for a second interval subsequent to the first interval, based at least in part on the average dynamic power values;
wherein the power action is determined based at least in part on the dynamic power allocated to the respective compute units.

4. The method of claim 3, wherein the respective compute units are allocated dynamic power in an order corresponding to temperature impacts of the respective compute units.

5. The method of claim 3, further comprising determining expected temperatures of the respective compute units during the second interval, based at least in part on the dynamic power allocated to the respective compute units, wherein the power action is determined based at least in part on the expected temperatures.

6. The method of claim 1, wherein the power report specifies an amount of time during which a respective compute unit of the plurality of compute units is active during a first interval.

7. The method of claim 6, further comprising:
calculating average dynamic power values for the plurality of compute units during the first interval, based at least in part on the power report; and
allocating dynamic power to respective compute units of the plurality of compute units for a second interval subsequent to the first interval, based at least in part on the average dynamic power values;
wherein the power action is determined based at least in part on the dynamic power allocated to the respective compute units.

8. The method of claim 7, further comprising determining expected temperatures of the respective compute units during the second interval, based at least in part on the dynamic power allocated to the respective compute units, wherein the power action is determined based at least in part on the expected temperatures.

9. The method of claim 1, wherein determining the power action comprises selecting a performance state, the performance state comprising a specified power supply voltage and a specified clock frequency.

10. The method of claim 1, wherein determining the power action comprises selecting a respective compute unit of the plurality of compute units to be decoupled from a power supply or a clock signal.

11. The method of claim 1, further comprising:
in a core processing complex coupled to the interface and comprising the plurality of compute units:
generating the power report;
providing the power report to the power management controller through the interface;
receiving the message specifying the power action from the power management controller through the interface; and
performing the power action.

12. A circuit, comprising:
an interface to convey a power report for a plurality of compute units; and
a power management controller, coupled to the interface, to receive the power report, determine a power action for the plurality of compute units based at least in part on the power report and a temperature impact for at least one compute unit of the plurality of compute units, the temperature impact for the at least one compute unit determined based at least in part on a physical position of the at least one compute unit with respect to at least one other compute unit and one or more edges of a die on which the compute unit and the at least one other compute unit are located, and transmit a message specifying the power action through the interface.

13. The circuit of claim 12, wherein:
the power report specifies micro-operation retirement counts for respective compute units of the plurality of compute units for a first interval; and
the power management controller is further to:
calculate average dynamic power values for the respective compute units during the first interval, based at least in part on the micro-operation retirement counts;
allocate dynamic power to the respective compute units for a second interval subsequent to the first interval, based at least in part on the average dynamic power values; and
determine the power action based at least in part on the dynamic power allocated to the respective compute units.

14. The circuit of claim 13, wherein the power management controller is to allocate dynamic power to the respective compute units in an order corresponding to temperature impacts of the respective compute units.

15. The circuit of claim 13, wherein the power management controller is further to:
- determine expected temperatures of the respective compute units during the second interval, based at least in part on the dynamic power allocated to the respective compute units; and
- determine the power action based at least in part on the expected temperatures.

16. The circuit of claim 12, wherein:
the power report specifies an amount of time during which a respective compute unit of the plurality of compute units is active during a first interval; and
the power management controller is further to:
calculate average dynamic power values for the plurality of compute units, based at least in part on the power report;
allocate dynamic power to respective compute units of the plurality of compute units for a second interval subsequent to the first interval, based at least in part on the average dynamic power values; and
determine the power action based at least in part on the dynamic power allocated to the respective compute units.

17. The circuit of claim 16, wherein the power management controller is further to:
determine expected temperatures of the respective compute units during the second interval, based at least in part on the dynamic power allocated to the respective compute units; and
determine the power action based at least in part on the expected temperatures.

18. The circuit of claim 12, further comprising a core processing complex coupled to the interface, the core processing complex comprising:
the plurality of compute units; and
power management logic to generate the power report, to receive the message specifying the power action, and to perform the power action.

19. The circuit of claim 18, wherein the power action is selected from the group consisting of an action to set a performance state, an action to decouple a respective compute unit of the plurality of compute units from a power supply, and an action to decouple a respective compute unit of the plurality of compute units from a clock signal.

20. A circuit, comprising:
means for conveying a power report for a plurality of compute units; and
means for determining a power action for the plurality of compute units based at least in part on the power report and a temperature impact for at least one compute unit of the plurality of compute units, the temperature impact for the at least one compute unit determined based at least in part on a physical position of the at least one compute unit with respect to at least one other compute unit and one or more edges of a die on which the compute unit and the at least one other compute unit are located, and for transmitting a message specifying the power action.

* * * * *